(12) United States Patent
Mizobuchi et al.

(10) Patent No.: US 12,391,259 B2
(45) Date of Patent: Aug. 19, 2025

(54) BLIND SPOT ASSIST DEVICE

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Yujiro Mizobuchi, Nisshin (JP); Hiroshi Ando, Nisshin (JP); Kodai Takeda, Nisshin (JP)

(73) Assignees: DENSO CORPORATION, Kariya (JP); TOYOTA JIDOSHA KABUSHIKI KAISHA, Toyota (JP); MIRISE Technology Corporation, Nisshin (JP)

( * ) Notice: Subject to any disclaimer, the term of this patent is extended or adjusted under 35 U.S.C. 154(b) by 660 days.

(21) Appl. No.: 17/836,446

(22) Filed: Jun. 9, 2022

(65) Prior Publication Data

US 2022/0402506 A1    Dec. 22, 2022

(30) Foreign Application Priority Data

Jun. 22, 2021  (JP) .................................. 2021-103414

(51) Int. Cl.
*B60W 40/09*    (2012.01)
*B60W 40/10*    (2012.01)

(52) U.S. Cl.
CPC ............ *B60W 40/09* (2013.01); *B60W 40/10* (2013.01); *B60W 2554/4048* (2020.02); *B60W 2554/4049* (2020.02)

(58) Field of Classification Search
None
See application file for complete search history.

(56) References Cited

U.S. PATENT DOCUMENTS

| | | | |
|---|---|---|---|
| 2013/0044138 A1* | 2/2013 | Koga .................... | B60K 35/53 345/672 |
| 2014/0140653 A1 | 5/2014 | Brown et al. | |
| 2014/0140654 A1 | 5/2014 | Brown et al. | |
| 2018/0162277 A1 | 6/2018 | Takagi et al. | |
| 2018/0239177 A1* | 8/2018 | Oh ....................... | G02B 6/0088 |
| 2018/0373115 A1 | 12/2018 | Brown et al. | |
| 2019/0210526 A1* | 7/2019 | Takiguchi ............. | B60K 35/28 |

(Continued)

FOREIGN PATENT DOCUMENTS

| | | | |
|---|---|---|---|
| JP | 2005199844 A | * | 7/2005 |
| JP | 2006231998 A | * | 9/2006 |

(Continued)

*Primary Examiner* — Shan Liu
(74) *Attorney, Agent, or Firm* — Posz Law Group, PLC

(57) ABSTRACT

A blind spot assist device includes a first optical element and a second optical element. The first optical element reflects a part of incident light having a first angle of incidence at different second angles such that light is incident at the first angle on the first optical element from an outdoor view and reflected at the second angles on the first optical element. The second optical element is positioned to face the first optical element and reflects incident lights having different angles of incidence at a third angle such that lights reflected by the first optical element are incident at the second angles on the second optical element and reflected at the third angle on the second optical element toward a user.

11 Claims, 5 Drawing Sheets

(56) References Cited

U.S. PATENT DOCUMENTS

2021/0199993 A1* 7/2021 Peli .................. G02B 27/00
2021/0278739 A1   9/2021 Brown et al.

FOREIGN PATENT DOCUMENTS

| JP | 6172511 B2 | 8/2017 |
| JP | 6464733 B2 | 2/2019 |
| JP | 2020166072 A * | 10/2020 |

* cited by examiner $\theta = \phi 1a < \phi 2 < \phi 3$ $\theta < \phi 1b < \phi 2 < \phi 3$ $\theta = \phi 1a < \phi 2 < \phi 3$ $\theta < \phi 1b < \phi 2 < \phi 3$ ☐ A0: TRANSMISSION / REFRACTION AT $\phi 0$ ▦ A1: REFLECTION AT $\phi 1$ ▩ A2: REFLECTION AT $\phi 2$ ▥ A3: REFLECTION AT $\phi 3$ $\theta = \phi 1 < \phi 2 < \phi 3$
or
$\theta < \phi 1 < \phi 2 < \phi 3$

BLIND SPOT ASSIST DEVICE

CROSS REFERENCE TO RELATED APPLICATION

This application is based on and incorporates herein by reference Japanese Patent Application No. 2021-103414 filed on Jun. 22, 2021.

TECHNICAL FIELD

The present disclosure relates to a blind spot assist device.

BACKGROUND

A blind spot assist device includes a semi-transparent mirror and a plane mirror arranged facing the semi-transparent mirror to assist a user to see an outdoor view in a blind spot.

SUMMARY

According to at least one embodiment of the disclosure, a blind spot assist device includes a first optical element and a second optical element. The first optical element reflects a part of incident light having a first angle of incidence at different second angles such that light is incident at the first angle on the first optical element from an outdoor view and reflected at the second angles on the first optical element. The second optical element is positioned to face the first optical element and reflects incident lights having different angles of incidence at a third angle such that lights reflected by the first optical element are incident at the second angles on the second optical element and reflected at the third angle on the second optical element toward a user.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
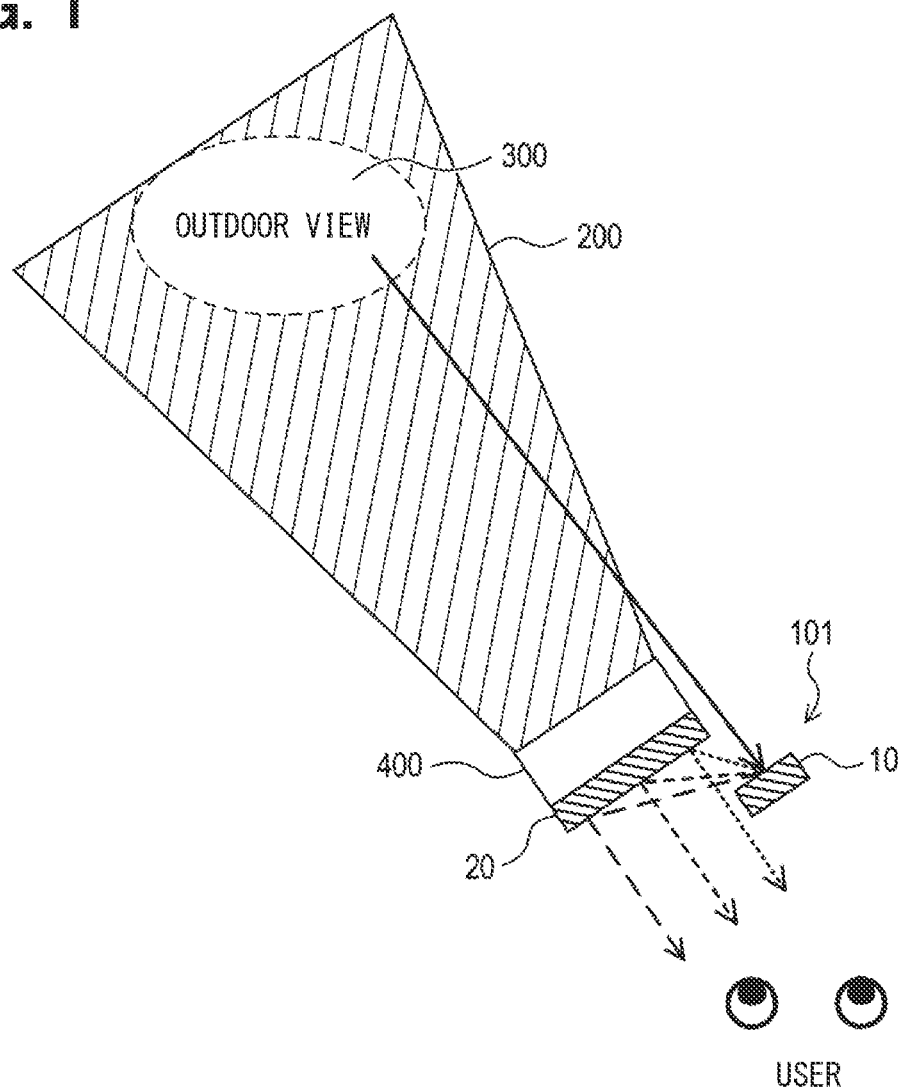
FIG. 1 is a diagram showing an arrangement of a blind spot assist device relative to a blind spot area, according to the first embodiment.

To begin with, examples of relevant techniques will be described.

A blind spot assist device according to a comparative example includes a semi-transparent mirror and a plane mirror arranged facing the semi-transparent mirror. In the blind spot assist device, light incident on the semi-transparent mirror from an object located in a blind spot area is repeatedly reflected between the semi-transparent mirror and the plane mirror, and accordingly multiple lights showing an image of the object are reflected from the semi-transparent mirror. Therefore, a user can visually recognize the image of the object in a wide range.

When a distance between the semi-transparent mirror and the plane mirror is reduced, the blind spot assist device can be made thinner, but a luminance may decrease and a luminance unevenness may increase due to increase in number of the reflections of the light. On the other hand, when the distance between the semi-transparent mirror and the plane mirror is increased, the luminance can be increased and the luminance unevenness can be decreased, but the blind spot assist device may become large.

In contrast, according to one aspect of the present disclosure, a blind spot assist device is capable of being reduced in thickness while realizing increase of luminance and decrease of luminance unevenness.

According to one aspect of the disclosure, a blind spot assist device includes a first optical element and a second optical element. The first optical element reflects a part of incident light having a first angle of incidence at different second angles such that light is incident at the first angle on the first optical element from an outdoor view and reflected at the second angles on the first optical element. The second optical element is positioned to face the first optical element and reflects incident lights having different angles of incidence at a third angle such that lights reflected by the first optical element are incident at the second angles on the second optical element and reflected at the third angle on the second optical element toward a user.

In the blind spot assist device according to the aspect, the first optical element reflects the incident light at the different second angles, and the second optical element reflects the multiple incident lights toward the user. Therefore, the light reflected by the first optical element is incident on different regions of the second optical element, is reflected toward the user in a wide range. When a predetermined condition is satisfied, the light reflected by the second optical element does not return to the first optical element. Therefore, in order to widen a visible range of the outdoor view, repetition of light reflection between the first optical element and the second optical element can be reduced while a distance between the first optical element and the second optical element is reduced. As a result, the blind spot assist device can be made thinner while improving a luminance and reducing a luminance unevenness.

According to another aspect of the disclosure, a blind spot assist device includes a first optical element and a second optical element. The first optical element transmits a part of incident light having a first angle of incidence and reflects another part of the incident light at different second angles such that light is incident at the first angle on the first optical element from an outdoor view and partially reflected at the second angles on the first optical element. The second optical element is positioned to face the first optical element and reflects incident lights having different angles of incidence at a third angle such that lights reflected by the first optical element are incident at the second angles on the second optical element and reflected at the third angle on the second optical element toward a user.

The blind spot assist device according to the other aspect has the same effects as the blind spot assist device described above, and can further expand the visible range of the outdoor view.

Hereinafter, embodiments of the present disclosure will be described with reference to the drawings. Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A blind spot assist device 101 according to a first embodiment is used for a user to visually recognize an outdoor view in a blind spot area. The blind spot assist device 101 is installed in, for example, a vehicle, and supplements a blind spot that cannot be seen by a user (specifically, a driver). FIG. 1 shows the blind spot assist device 101 attached to a front pillar 400 of the vehicle. More specifically, when a driver's seat is on a right side of the vehicle, the blind spot assist device 101 is attached to the front pillar 400 on the right side. When the driver's seat is on a left side of the vehicle, the blind spot assist device 101 is attached to the front pillar 400 on the left side.

The user can directly see an outdoor view spreading outside a front glass and a side glass through the front glass and the side glass. The front pillar 400 is provided between the front glass and the side glass. The front pillar 400 blocks the user's field of view and creates a blind spot area 200. That is, the blind spot area 200 is between an area visible through the front glass and an area visible through the side glass. The user cannot directly see an outdoor view in the blind spot area 200.

Next, an configuration of the blind spot assist device 101 will be described with reference to FIG. 2. The blind spot assist device 101 includes a first optical element 11 and a second optical element 20. The first optical element 11 and the second optical element 20 are plate-shaped members, and are arranged parallel to each other and apart from each other at a predetermined interval W. More specifically, the first optical element 11 and the second optical element 20 are fixed to the front pillar 400 via a holder. The first optical element 11 is arranged between the user and the second optical element 20. The second optical element 20 is arranged between the front pillar 400 and the first optical element 11.

The first optical element 11 and the second optical element 20 are reflection optical elements. The first optical element 11 and the second optical element 20 may be mirrors. The first optical element 11 and the second optical element 20 each include a transparent resin material and a reflection angle adjusting member provided on the resin material. The reflection angle adjusting member may be a member such as a hologram sheet, a prism sheet, or a diffractive optical element, or a mirror-coated member obtained by coating of, for example, a hologram sheet, a prism sheet, or a diffractive optical element. The first optical element 11 and the second optical element 20 are arranged so that their reflection angle adjusting members face each other.

Figure 2:
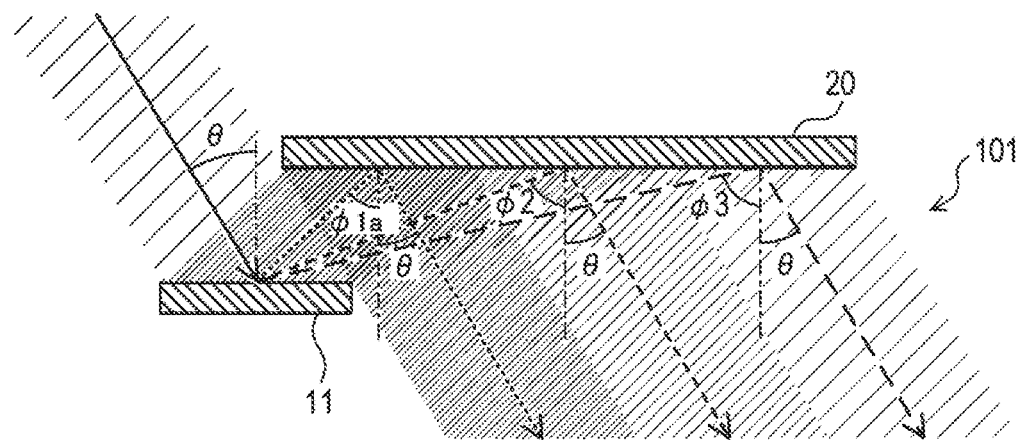
FIG. 2 is a side view illustrating a configuration of the blind spot assist device according to the first embodiment.

As shown in FIG. 2, the first optical element 11 reflects a part of incident light, incident at a first angle $\theta$ from the outdoor view, at second angles different from each other. The second angles include $\varphi 1a, \varphi 2, \ldots \varphi n$. The relationship between the first angle and the second angles satisfies $\theta = \varphi 1a < \varphi 2 < \ldots < \varphi n$. Where, n is an integer greater than or equal to 2.

The first optical element 11 includes multiple first reflection angle adjusting members stacked in a direction perpendicular to a facing surface of the first optical element 11 that faces the second optical element 20. The first reflection angle adjusting members include a member that reflects the incident light having the incident angle $\theta$ at the reflection angle $\varphi 1a$, and a member that reflects the incident light having the incident angle $\theta$ at a reflection angle $\varphi s$. Where, s is an integer greater than or equal to 2 and less than or equal to n.

The second optical element 20 reflects multiple incident lights, which are reflected by the first optical element 11 and incident at the second angles, at a third angle in a direction toward the user. Both the third angle and the first angle are $\theta$.

The second optical element 20 includes multiple second reflection angle adjusting members stacked in a direction perpendicular to a facing surface of the second optical element 20 that faces the first optical element 11. The second reflection angle adjusting members include a member that reflects the incident light having the incident angle $\varphi 1a$ at the reflection angle $\theta$, and a member that reflects the incident light having an incident angle $\varphi t$ at the reflection angle $\theta$. Where, t is an integer greater than or equal to 2 and less than or equal to n.

A relationship between multiple first reflectances of the first optical element 11 and multiple second reflectances of the second optical element 20 satisfies $R11 \times R21 = R12 \times R22 = \ldots = R1n \times R2n$. R11 is a first reflectance of the first optical element 11 when the light is reflected by the first optical element 11 at the second angle $\varphi 1a$. R1s is a first reflectance of the first optical element 11 when the light is reflected by the first optical element 11 at the second angle $\varphi s$. R21 is a second reflectance of the second optical element 20 when the light incident at the second angle $\varphi 1a$ is reflected by the second optical element 20. R2t is a second reflectance of the second optical element 20 when the light incident at the second angle $\varphi t$ is reflected by the second optical element 20.

The light reflected by the first optical element 11 at the second angle $\varphi 1a$ is reflected on a region of the second optical element 20 closest to the first optical element 11 (leftmost region in FIG. 2). Further, the light reflected by the first optical element 11 at the second angle $\varphi n$ is reflected on a region of the second optical element 20 farthest from the first optical element 11 (rightmost region in FIG. 2). That is, the multiple lights reflected by the first optical element 11 are reflected in different regions of the second optical element 20 because the second angles are different from each other. A region of the second optical element 20, in which light is reflected, becomes farther from the first optical element 11 with increase in the second angle of the light. In the following, the right side of the drawing is referred to as a right side of the blind spot assist device 101, and the left side of the drawing is referred to as a left side of the blind spot assist device 101.

Figure 3:
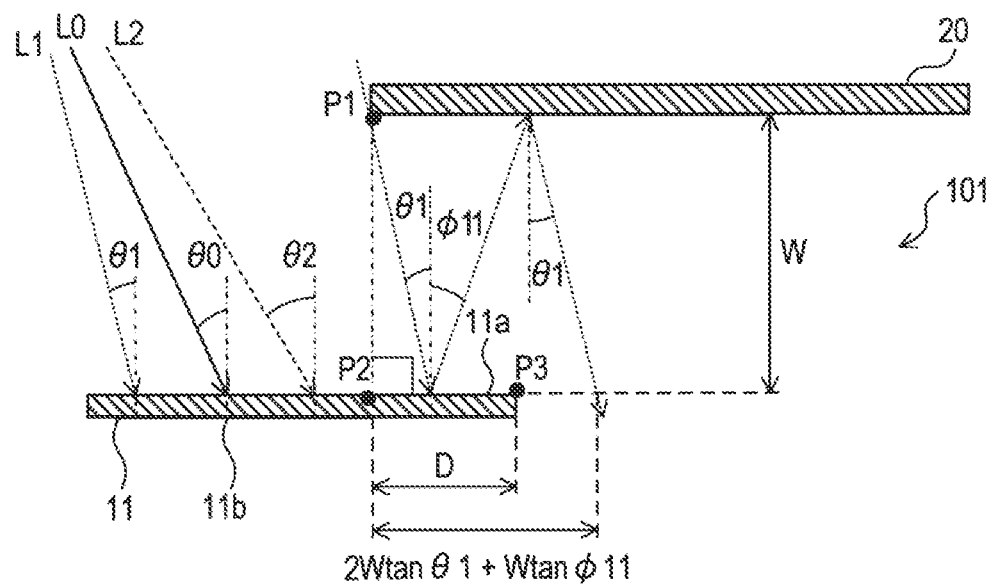
FIG. 3 is a diagram illustrating a condition of a length of a facing portion of a first optical element of the blind spot assist device according to the first embodiment.

As shown in FIG. 3, the first optical element 11 includes a base portion 11a and an extension portion 11b. The base portion 11a is a portion of the first optical element 11 facing the second optical element 20. The extension portion 11b extends from the base portion 11a to the left side. The base portion 11a has a length D. The length D corresponds to a distance from an intersection P2 to a right end P3 of the first optical element 11. The intersection P2 corresponds to a point where a perpendicular from a left end P1 of the second optical element 20 to the first optical element 11 intersects the first optical element 11.

In order not to repeat the reflection between the first optical element 11 and the second optical element 20, it is necessary to prevent the light reflected by the second optical element 20 from being incident on the first optical element 11 again. The light reflected by the second optical element 20 does not enter the first optical element 11 again under a condition where the length D, the interval W, the first angle θ, and the minimum second angle $\varphi 1a$ satisfy an equation (1) shown below. When the formula (1) is satisfied, repeated reflections between the first optical element 11 and the second optical element 20 can be avoided.

$$D < 2W \tan \theta + W \tan \varphi 1a \quad (1)$$

As shown in FIG. 3, an external light arriving at the blind spot assist device 101 may have a certain spread, and the first angle θ may have a range from θ1 to θ2. The range from θ1 to θ2 is an angle range centered at θ0. The first angle θ1 is an incident angle of a light ray L1 and is the smallest incident angle. The first angle θ2 is an incident angle of a light ray L2, and is the largest incident angle. The first angle θ0 is an incident angle of a light ray L0, and is the incident angle at the center.

When the first angle θ has such range, each of the second angles $\varphi 1a$, $\varphi 2$, $\varphi n$ also has a range. When the light ray L1 is reflected, the second angles are $\varphi 11$, $\varphi 12$, $\varphi 13$, . . . $\varphi 1n$, and satisfy $\varphi 11 < \varphi 12 < \varphi 13 < \ldots < \varphi 1n$. When the light ray L2 is reflected, the second angles are $\varphi 21$, $\varphi 22$, $\varphi 23$, . . . $\varphi 2n$, and satisfy $\varphi 21 < \varphi 22 < \varphi 23 < \ldots < \varphi 2n$. When the light ray L0 is reflected, the second angles are $\varphi 01$, $\varphi 02$, $\varphi 03$, . . . $\varphi 0n$, and satisfy $\varphi 01 < \varphi 02 < \varphi 03 < \ldots < \varphi 0n$.

When the external light has a certain spread, and the first angle θ1 of the light ray L2 having the smallest incident angle and the second angle $\varphi 11$ satisfy the equation (1), repetition of reflection of the light ray L2 between the first optical element 11 and the second optical element 20 can be avoided. That is, when the following equation (2) is satisfied, repeated reflections between the first optical element 11 and the second optical element 20 can be avoided.

$$D < 2W \tan \theta 1 + W \tan \varphi 11 \quad (2)$$

When the second angles are appropriately set, the n lights reflected by the second optical element 20 are continuous in the right-left direction in the drawings. Therefore, the blind spot assist device 101 reflects light showing an outdoor view in the θ direction in a wide range along the right-left direction of the user's eyes. Therefore, an eye box in which the outdoor view can be visually recognized can be expanded without repeating the reflection. The user can visually recognize, via the blind spot assist device 101, the outdoor view in the θ direction in a wide range in the right-left direction such that the outdoor view is continuous with an outdoor view that can be directly seen.

Further, according to the blind spot assist device 101, it is not necessary to repeat reflection of light between the first optical element 11 and the second optical element 20 in order to widen the eye box. Therefore, even if the distance W between the first optical element 11 and the second optical element 20 is reduced, the repetition of reflection can be reduced, and decrease in luminance and unevenness in luminance can be reduced.

Further, the relationship between the first reflectances and the second reflectances satisfy $R11 \times R21 = R12 \times R22 = \ldots = R1n \times R2n$. Therefore, luminance losses of the multiple lights reflected from the second optical element 20 becomes constant, and the luminance unevenness is further reduced.

Further, the first optical element 11 reflects the light incident from the outdoor view only once. Therefore, an aperture width (that is, a length in the right-left direction) can be shortened as compared with a case where repeated reflection of the light is required. The aperture width of the first optical element 11 can be shorter than that of the second optical element 20. More specifically, the aperture width of the first optical element 11 can be shortened to a length of a projection component $W \cos \theta$ of the incident width W of the light incident on the blind spot assist device 101 from the outdoor view. As a result, the blind spot assist device 101 can be miniaturized.

According to the first embodiment described in detail above, the following effects are provided.

(1) The lights reflected by the first optical element 11 are incident on different regions of the second optical element 20, and reflected in the direction toward the user in a wide range. Therefore, the incident light from the outdoor view can be reflected in the wide range without repeated reflections of the light between the first optical element 11 and the second optical element 20. Therefore, it is not necessary to repeat reflection of the light between the first optical element 11 and the second optical element 20 in order to widen the eye box. Therefore, the reflection of the light between the first optical element 11 and the second optical element 20 can be limited to one time while reducing the distance between the first optical element 11 and the second optical element 20. As a result, the blind spot assist device 101 can be made thinner while improving the luminance and reducing the luminance unevenness.

(2) Since the relationship between the first angle and the second angles satisfy $\theta = \varphi 1a < \varphi 2 < \ldots < \varphi n$, the lights reflected by the first optical element 11 are incident on the different regions of the second optical element 20 and reflected in a wide range in the right-left direction. Therefore, the user can visually recognize the outdoor view in the blind spot area with a wide eye box.

(3) Since the relationship between the first reflectances and the second reflectances satisfy $R11 \times R21 = R12 \times R22 = \ldots = R1n \times R2n$, losses of the luminance of the lights reflected toward the user can be made constant, and thereby the luminance unevenness can be reduced.

Second Embodiment

Since the basic configuration of a second embodiment is similar to the first embodiment, the difference will be described below. Note that the same reference numerals as those in the first embodiment indicate the same configuration, and refer to the preceding descriptions.

The blind spot assist device 101 according to the first embodiment described above includes the first optical element 11. On the other hand, a blind spot assist device 102 according to a second embodiment includes a first optical element 12.

Figure 4:
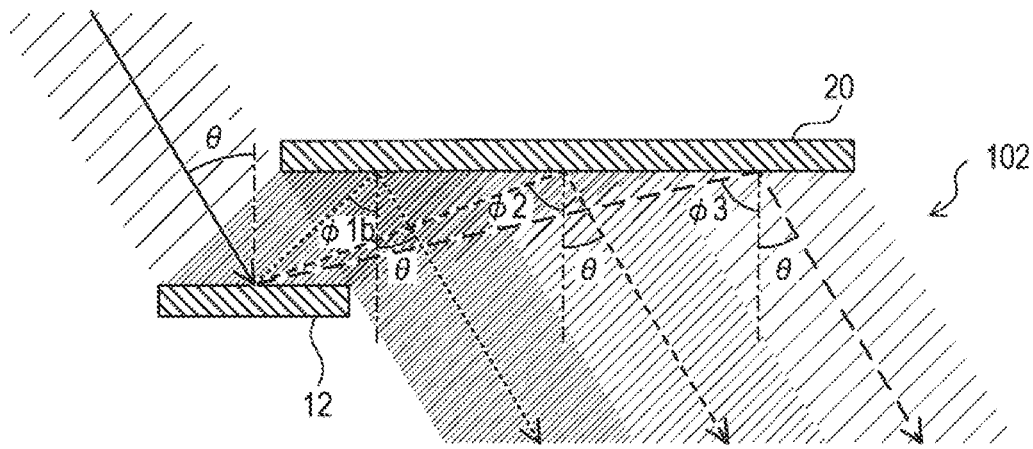
FIG. 4 is a side view illustrating a configuration of a blind spot assist device according to a second embodiment.

As shown in FIG. 4, an arrangement of the first optical element 12 is the same as the arrangement of the first optical element 11. In the first embodiment, the first optical element 11 reflects a part of incident light, incident from the outdoor view at the first angle $\theta$, at the second angles $\varphi 1a$, $\varphi 2, \ldots, \varphi n$. In the first embodiment, the relationship between the first angle and the second angles satisfy $\theta = \varphi 1a < \varphi 2 < \ldots < \varphi n$. On the other hand, as shown in FIG. 4, the first optical element 12 reflects a part of incident light, incident from the outdoor view at the first angle $\theta$, at second angles $\varphi 1b, \varphi 2, \ldots, \varphi n$. In the second embodiment, the relationship between the first angle and the second angles satisfy $\theta < \varphi 1b < \varphi 2 < \ldots < \varphi n$.

Further, a first reflectance of the first optical element 12 when the light is reflected at the second angle $\varphi 1b$ is R11, and a second reflectance of the second optical element 20 when the light is incident at the second angle $\varphi 1b$ is R21. Therefore, similar to the first embodiment, the relationship between the first reflectances and the second reflectances satisfy $R11 \times R21 = R12 \times R22 = \ldots = R1n \times R2n$.

That is, the first optical element 12 reflects incident light at the second angles larger than the first angle $\theta$. As a result, a distance W between the first optical element 12 and the second optical element 20 can be further reduced.

Figure 5:
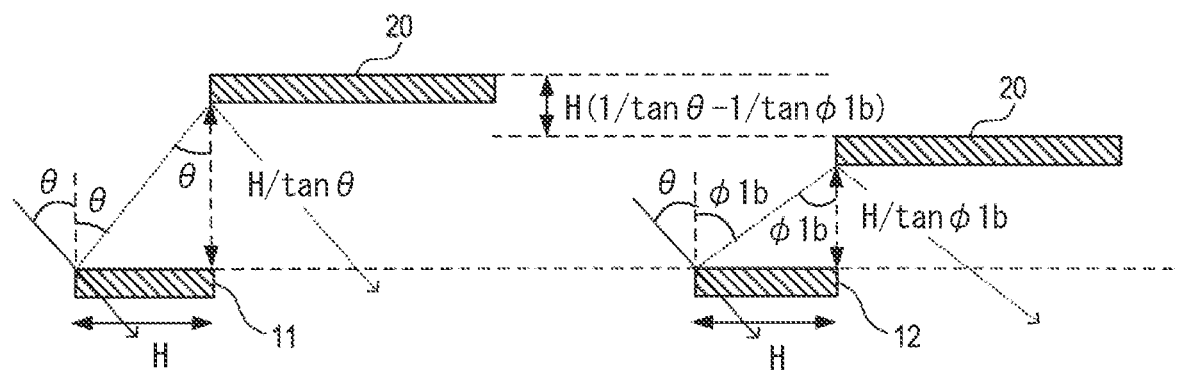
FIG. 5 is a diagram illustrating a comparison in interval between a first optical element and a second optical element according to the first and second embodiments.

As shown in FIG. 5, in the first embodiment, the light incident at the first angle $\theta$ is reflected at the second angle $\theta$ ($=\varphi 1a$). Therefore, the distance W between the first optical element 11 and the second optical element 20 becomes H/tan $\theta$. Where, H is an aperture width (that is, a length in the right-left direction) of the first optical element 11, 12. On the other hand, in the second embodiment, the light incident at the first angle $\theta$ is reflected at the second angle $\varphi 1b$. Therefore, the interval W becomes H/tan $\varphi 1b$. When $\theta < \varphi 1b$, the interval W in the second embodiment can be reduced by H(1/tan $\theta$ – 1/tan $\theta 1$) than the interval W in the first embodiment. As a result, the blind spot assist device 102 can be made thinner.

According to the second embodiment described in detail above, the effects (1) and (3) of the above-described first embodiment are obtained, and further, the following effect can be obtained.

(4) Since the relationship between the first angle and the second angles satisfy $\theta < \varphi 1b < \varphi 2 < \ldots < \varphi n$, the distance between the first optical element 12 and the second optical element 20 can be further reduced, and thereby the blind spot assist device 102 can be made thinner.

Third Embodiment

Since the basic configuration of a third embodiment is similar to the first embodiment, the differences will be described below. Note that the same reference numerals as those in the first embodiment indicate the same configuration, and refer to the preceding descriptions.

The blind spot assist device 101 according to the first embodiment described above includes the first optical element 11 that is a reflection optical element. On the other hand, a blind spot assist device 103 according to the third embodiment includes a first optical element 13 that is a transmission and reflection optical element. The first optical element 13 may be a semi-transparent mirror that transmits a part of incident light and reflects another part of the incident light.

Figure 6:
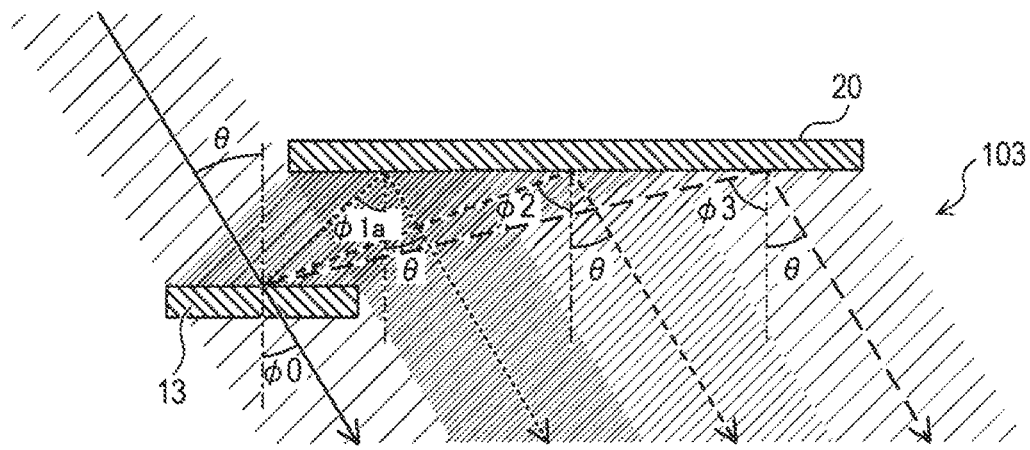
FIG. 6 is a side view illustrating a configuration of a blind spot assist device according to a third embodiment.

As shown in FIG. 6, an arrangement of the first optical element 13 is the same as the arrangement of the first optical element 11. The first optical element 13 transmits a part of light incident from an outdoor view at a first angle $\theta$ with a predetermined transmittance T1. As a result, an eye box through which the outdoor view can be can be visually recognized in the $\theta$ direction is expanded as compared with the first and second embodiments.

Further, the first optical element 13 reflects another part of the light at second angles $\varphi 1a, \varphi 2, \ldots, \varphi n$ which are different from each other. The second angles $\varphi 1a, \varphi 2, \ldots, \varphi n$ satisfy $\theta = \varphi 1a < \varphi 2 < \ldots < \varphi n$, similar to the first embodiment. The relationship among the predetermined transmittance, first reflectances and second reflectances satisfy $T1 = R11 \times R21 = R12 \times R22 = \ldots = R1n \times R2n$.

According to the third embodiment described in detail above, the effects (1) and (2) of the above-described first embodiment are obtained, and further, the following effects can be obtained.

(5) The eye box through which the outdoor view can be visually recognized in the $\theta$ direction can be further enlarged.

(6) Since the relationship among the predetermined transmittance, the first reflectances and the second reflectances satisfy $T1 = R11 \times R21 = R12 \times R22 = R1n \times R2n$, losses of the luminance of the lights reflected toward the user can be made constant, and thereby the luminance unevenness can be reduced.

Fourth Embodiment

Since the basic configuration of a fourth embodiment is similar to the third embodiment, the differences will be described below. Note that the same reference numerals as those in the third embodiment indicate the same configuration, and refer to the preceding descriptions.

The blind spot assist device 103 according to the third embodiment described above includes the first optical element 13. On the other hand, a blind spot assist device 104 according to a fourth embodiment includes a first optical element 14.

Figure 7:
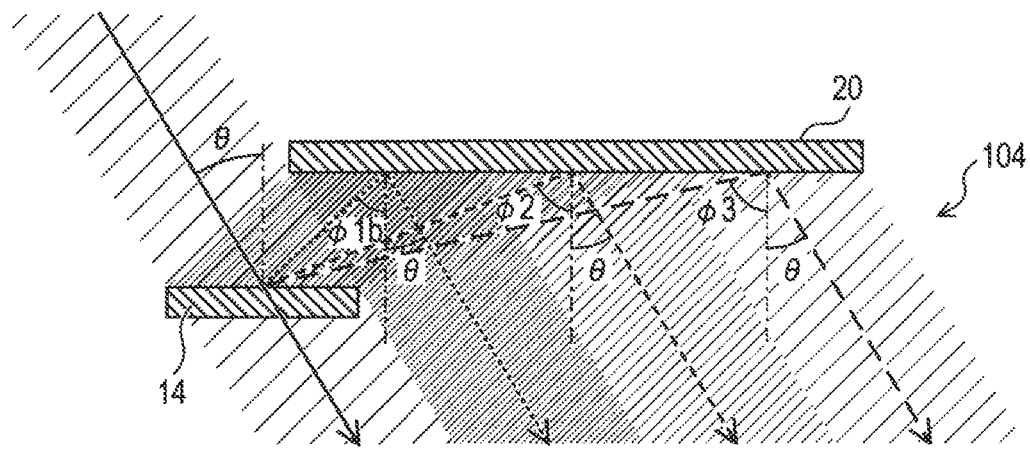
FIG. 7 is a side view illustrating a configuration of a blind spot assist device according to a fourth embodiment.

As shown in FIG. 7, an arrangement of the first optical element 14 is the same as the arrangement of the first optical element 11. The first optical element 14 is a transmission and reflection optical element, similar to the first optical element 13. The first optical element 14 may be a semi-transparent mirror that transmits a part of incident light and reflects another part of the incident light. The first optical element 14 transmits a part of light incident from an outdoor view at a first angle $\theta$ with a predetermined transmittance T1. Further, the first optical element 14 reflects another part of the light at second angles $\varphi 1a, \varphi 2, \ldots, \varphi n$ which are different from each other. The second angles $\varphi 1b, \varphi 2, \ldots, \varphi n$ satisfy $\theta < \varphi 1b < \varphi 2 < \ldots < \varphi n$, similar to the second embodiment. The relationship among the predetermined transmittance, first reflectances and second reflectances satisfy $T1 = R11 \times R21 = R12 \times R22 = \ldots = R1n \times R2n$. That is, the fourth embodiment corresponds to a combination of the second embodiment and the third embodiment.

According to the fourth embodiment described in detail above, the effect (1) of the above-described first embodiment, the effect (4) of the second embodiment and the effects (5) and (6) of the third embodiment can be obtained.

Fifth Embodiment

Since the basic configuration of a fifth embodiment is similar to the third embodiment, the differences will be described below. Note that the same reference numerals as those in the third embodiment indicate the same configuration, and refer to the preceding descriptions.

The first optical element 13 according to the third embodiment described above includes the first reflection angle adjusting members that are stacked and reflect incident light having the same incident angle at different reflection angles. The second optical element 20 according to the third embodiment described above includes the second reflection angle adjusting members that are stacked and reflect incident light having different incident angles at the same reflection angle.

Figure 8:
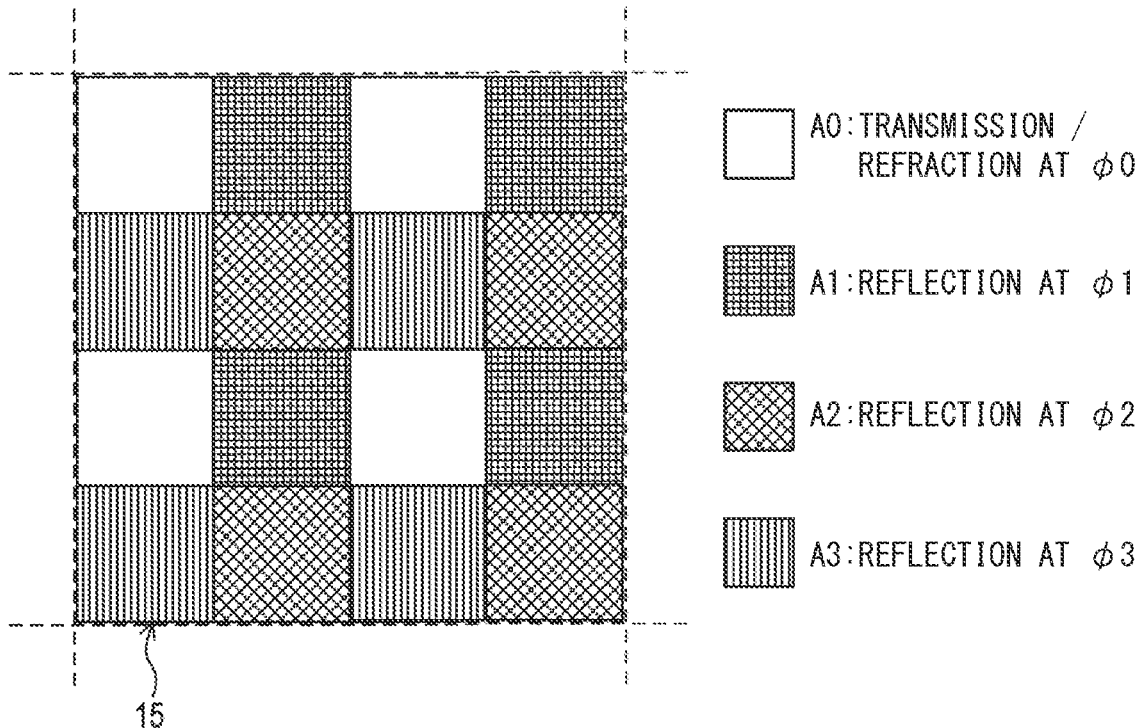
FIG. 8 is a top view illustrating a configuration of a first optical element according to a fifth embodiment.
Figure 9:
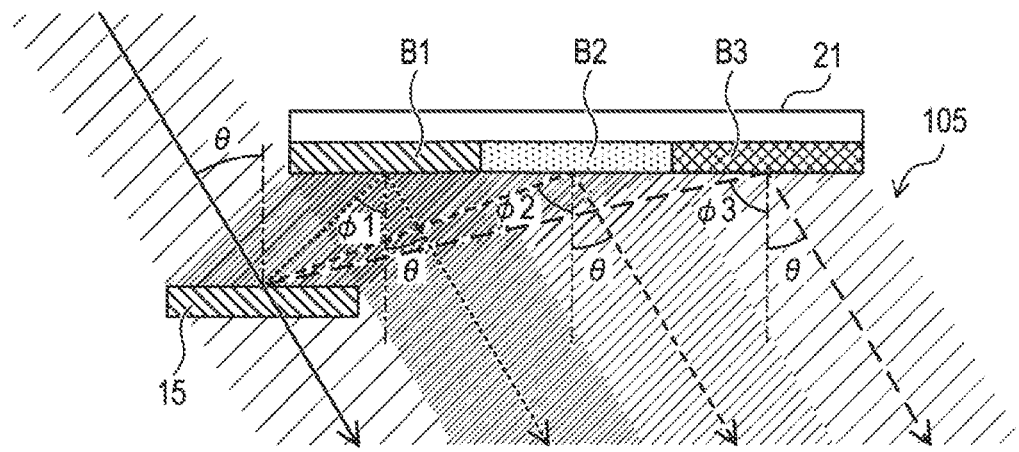
FIG. 9 is a side view illustrating a configuration of a blind spot assist device according to the fifth embodiment.

On the other hand, as shown in FIG. 8, a first optical element 15 according to the fifth embodiment is different from the first optical element 13 according to the third embodiment in that the first optical element 15 has (n+1) types of regions from a region A0 to a region An, and first reflection angle adjusting members are arranged in different regions of the first optical element 15. Further, as shown in FIG. 9, a second optical element 21 according to the fifth embodiment is different from the second optical element 20 according to the third embodiment in that the second optical element 21 has n regions from a region B1 to a region Bn, and second reflection angle adjusting members are arranged in different regions of the second optical element 21.

More specifically, the first optical element 15 includes multiple groups of the regions, and each of the groups consists of (n+1) regions from the region A0 to the region An. Each of the regions has a square shape. The region A0 is provided with a refraction angle adjusting member that refracts light at the refraction angle $\varphi 0$ when the light is incident on the refraction angle adjusting member at the first angle $\theta$. Further, a region Am is provided with a first reflection angle adjusting member that reflects light at the second angle $\varphi m$ when the light is incident on the first reflection angle adjusting member at the first angle $\theta$. Where, m is an integer greater than or equal to 1 and less than or equal to n. $\varphi 1$ may be equal to $\theta$ or larger than $\theta$. That is, $\varphi 1$ may be either $\varphi 1a$ or $\varphi 1b$.

In the first optical elements 11, 12, 13, and 14 according to the first to fourth embodiments, the incident light from the outdoor view is divided into n pieces and reflected. On the other hand, in the first optical element 15 according to the fifth embodiment, the incident light from the outdoor view is reflected on each region without being divided. Therefore, for example, when the first optical element 15 is divided into regions smaller than the resolution of human eyes such that an area of each region is reduced, the loss of luminance due to reflection of light by the first optical element 15 can be reduced. As a result, the user can clearly see the outdoor view.

The second optical element 21 is divided into n regions from the region B1 to the region Bn. A region Bk is a region on which the light reflected at the second angle $\varphi k$ is incident. Where, k is an integer greater than or equal to 1 and less than or equal to n. In the second optical element 20 according to the first to fourth embodiments, since lights incident at the second angles are reflected, a reflectance decreases and a loss of luminance increases. In the second optical element 21 according to the fifth embodiment, since a performance of asymmetric reflection is optimized for each region, the reflectance increases and the loss of luminance decreases.

According to the fourth embodiment described in detail above, the effects (1) and (2) of the above-described first embodiment, the effect (4) of the second embodiment and the effects (5) and (6) of the third embodiment can be obtained, and further, the following effects can be obtained.

(7) Since the first optical element 15 is divided into the (n+1) types of regions and reflects the incident light at the second angles different for each region, the loss of luminance due to the reflection by the first optical element 15 can be reduced.

(8) Since the second optical element 21 is divided into n regions and reflects light in different regions depending on the incident angle, the performance of asymmetric reflection can be optimized for each region and the reflectance can be increased. As a result, the loss of luminance can be reduced.

Other Embodiments

Although the embodiments of the present disclosure have been described above, the present disclosure is not limited to the embodiments described above, and various modifications can be made to implement the present disclosure.

Each of the above embodiments shows an example in which the blind spot assist device 101, 102, 103, 104, 105 is attached to the front pillar 400 of the vehicle. But, the attachment position of the blind spot assist device 101, 102, 103, 104, 105 is not limited to the front pillar 400 and may be another position in the vehicle. Further, the blind spot assist device 101, 102, 103, 104, 105 may be attached to an object other than the vehicle for use.

In the fifth embodiment, the first optical element 15 is the transmission and reflection optical element having the region A0, but the first optical element 15 may not have the region A0. That is, the first optical element 15 may be a reflection optical element having n types of regions from the region A1 to the region An. In this case, the number of regions forming each group of the regions is n.

The blind spot assist device 105 according to the fifth embodiment includes the first optical element 15 and the second optical element 21, but may include the first optical element 15 and the second optical element 20. Alternatively, the blind spot assist device 105 may include any one of the first optical elements 11, 12, 13, and 14 and the second optical element 21.

The multiple functions of one component in the above embodiment may be realized by multiple components, or a function of one component may be realized by multiple components. In addition, multiple functions of multiple components may be realized by one component, or a single function realized by multiple components may be realized by one component. A part of the configuration of the above embodiments may be omitted. Further, at least part of the configuration of the above-described embodiment may be added to or replaced with the configuration of another embodiment described above.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. A blind spot assist device comprising:
   a first optical element configured to reflect a part of incident light having a first angle of incidence at different second angles such that light is incident at the first angle on the first optical element from an outdoor view and reflected at the second angles on the first optical element; and a second optical element positioned to face the first optical element and configured to reflect incident lights having different angles of incidence at a third angle such that lights reflected by the first optical element are incident at the second angles on the second optical element and reflected at the third angle on the second optical element toward a user.

2. The blind spot assist device according to claim 1, wherein
the third angle is equal to the first angle,
a relationship between the first angle and the second angles satisfies $\theta = \varphi 1 < \varphi 2 < \ldots < \varphi n$,
n is an integer greater than or equal to 2,
$\theta$ is the first angle, and
$\varphi 1, \varphi 2, \ldots, \varphi n$ are the second angles.

3. The blind spot assist device according to claim 1, wherein
the third angle is equal to the first angle,
a relationship between the first angle and the second angles satisfies $\theta < \varphi 1 < \varphi 2 < \ldots < \varphi n$,
n is an integer greater than or equal to 2,
$\theta$ is the first angle, and
$\varphi 1, \varphi 2, \ldots, \varphi n$ are the second angles.

4. The blind spot assist device according to claim 3, wherein
the first optical element has n types of regions from a 1st region to a n-th region,
a m-th region of the first optical element is configured to reflect the incident light having $\theta$ of incidence at $\varphi m$, and
m is an integer between 1 and n inclusive.

5. The blind spot assist device according to claim 3, wherein
the second optical element has n regions from a 1st region to a n-th region,
a k-th region of the second optical element is configured to reflect the incident light having $\varphi k$ of incidence at $\theta$, and
k is an integer between 1 and n inclusive.

6. The blind spot assist device according to claim 3, wherein
the first optical element is configured to reflect a part of incident light by first reflectances when the incident light is incident at the first angle on the first optical element,
the second optical element is configured to reflect the incident lights having the second angles of incidence by second reflectances,
the first reflectances correspond to the second angles, respectively,
the second reflectances correspond to the second angles, respectively,
a relationship between the first reflectances and the second reflectances satisfies $$R11 \times R21 = R12 \times R22 = \ldots = R1n \times R2n,$$

R11, R12, ..., R1n are the first reflectances, and
R21, R22, ..., R2n are the second reflectances.

7. A blind spot assist device comprising:
a first optical element configured to transmit a part of incident light having a first angle of incidence and reflect another part of the incident light at different second angles such that light is incident at the first angle on the first optical element from an outdoor view and partially reflected at the second angles on the first optical element; and
a second optical element positioned to face the first optical element and configured to reflect incident lights having different angles of incidence at a third angle such that lights reflected by the first optical element are incident at the second angles on the second optical element and reflected at the third angle on the second optical element toward a user.

8. The blind spot assist device according to claim 7, wherein
the third angle is equal to the first angle,
a relationship between the third angle and the second angles satisfies $\theta = \varphi 1 < \varphi 2 < \ldots < \varphi n$,
n is an integer greater than or equal to 2,
$\theta$ is the first angle, and
$\varphi 1, \varphi 2, \ldots,$ on are the second angles.

9. The blind spot assist device according to claim 7, wherein
the third angle is equal to the first angle,
a relationship between the first angle and the second angles satisfies $\theta < \varphi 1 < \varphi 2 < \ldots < \varphi n$,
n is an integer greater than or equal to 2,
$\theta$ is the first angle, and
$\varphi 1, \varphi 2, \ldots, \varphi n$ are the second angles.

10. The blind spot assist device according to claim 9, wherein
the first optical element has (n+1) types of regions from a 0th region to a n-th region,
the 0th region of the first optical element is configured to transmit the incident light having $\theta$ of incidence at a refraction angle $\varphi 0$,
a m-th region of the first optical element is configured to reflect the incident light having $\theta$ of incidence at $\varphi m$, and
m is an integer between 1 and n inclusive.

11. The blind spot assist device according to claim 9, wherein
the first optical element is configured to transmit a part of incident light at a predetermined transmittance and reflect another part of the incident light by first reflectances when the incident light is incident at the first angle on the first optical element,
the second optical element is configured to reflect the incident lights having the second angles of incidence by second reflectances,
the first reflectances correspond to the second angles, respectively,
the second reflectances correspond to the second angles, respectively,
a relationship among the predetermined transmittance, the first reflectances and the second reflectances satisfies $$T1 = R11 \times R21 = R12 \times R22 = \ldots = R1n \times R2n,$$

T1 is the predetermined transmittance,
R11, R12, ..., R1n are the first reflectances, and
R21, R22, ..., R2n are the second reflectances.

* * * * *